(12) United States Patent
Numata et al.

(10) Patent No.: US 11,067,818 B2
(45) Date of Patent: Jul. 20, 2021

(54) DISPLAY DEVICE

(71) Applicant: Japan Display Inc., Minato-ku (JP)

(72) Inventors: Yudai Numata, Tokyo (JP); Takeo Koito, Tokyo (JP)

(73) Assignee: Japan Display Inc., Minato-ku (JP)

( * ) Notice: Subject to any disclaimer, the term of this patent is extended or adjusted under 35 U.S.C. 154(b) by 147 days.

(21) Appl. No.: 16/287,085

(22) Filed: Feb. 27, 2019

(65) Prior Publication Data

US 2019/0293949 A1    Sep. 26, 2019

(30) Foreign Application Priority Data

Mar. 20, 2018   (JP) .............................. JP2018-053427

(51) Int. Cl.
*G02B 27/09* (2006.01)
*G02F 1/1335* (2006.01)
*G02B 30/56* (2020.01)

(52) U.S. Cl.
CPC ......... *G02B 27/0977* (2013.01); *G02B 30/56* (2020.01); *G02F 1/133553* (2013.01); *G02F 2203/01* (2013.01)

(58) Field of Classification Search
CPC ................ G02B 27/0977; G02B 30/56; G02F 1/133553; G02F 2203/01

USPC ......................................................... 359/629
See application file for complete search history.

(56) References Cited

U.S. PATENT DOCUMENTS

2011/0181949 A1*  7/2011  Hashikawa .......... G02B 17/006
                                                              359/463
2013/0038934 A1    2/2013  Imamura et al.

FOREIGN PATENT DOCUMENTS

WO    WO 2009/136578 A1    11/2009
WO    WO 2011/136200 A1    11/2011

* cited by examiner

*Primary Examiner* — Marin Pichler
*Assistant Examiner* — Mitchell T Oestreich
(74) *Attorney, Agent, or Firm* — Oblon, McClelland, Maier & Neustadt, L.L.P.

(57) ABSTRACT

According to one embodiment, display device includes an optical member including a first main surface, and a second main surface on a side opposite to the first main surface, the optical member configured to form an image on a side of the second main surface with light incident from the first main surface, a reflective member including a reflective surface opposed to the first main surface, and a display portion located between the optical member and the reflective member, wherein the reflective member is arranged parallel to the optical member.

17 Claims, 9 Drawing Sheets

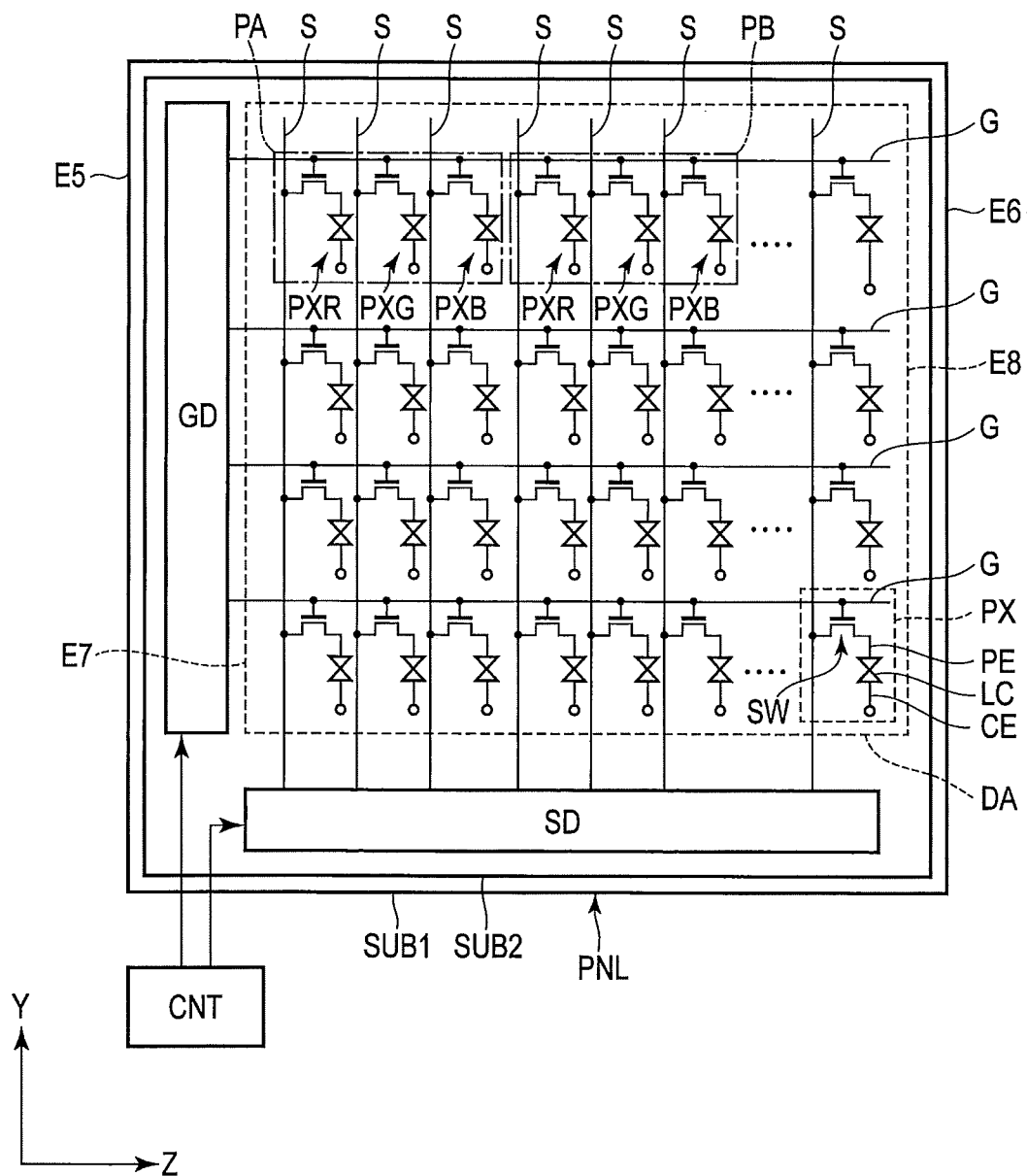
F I G. 4

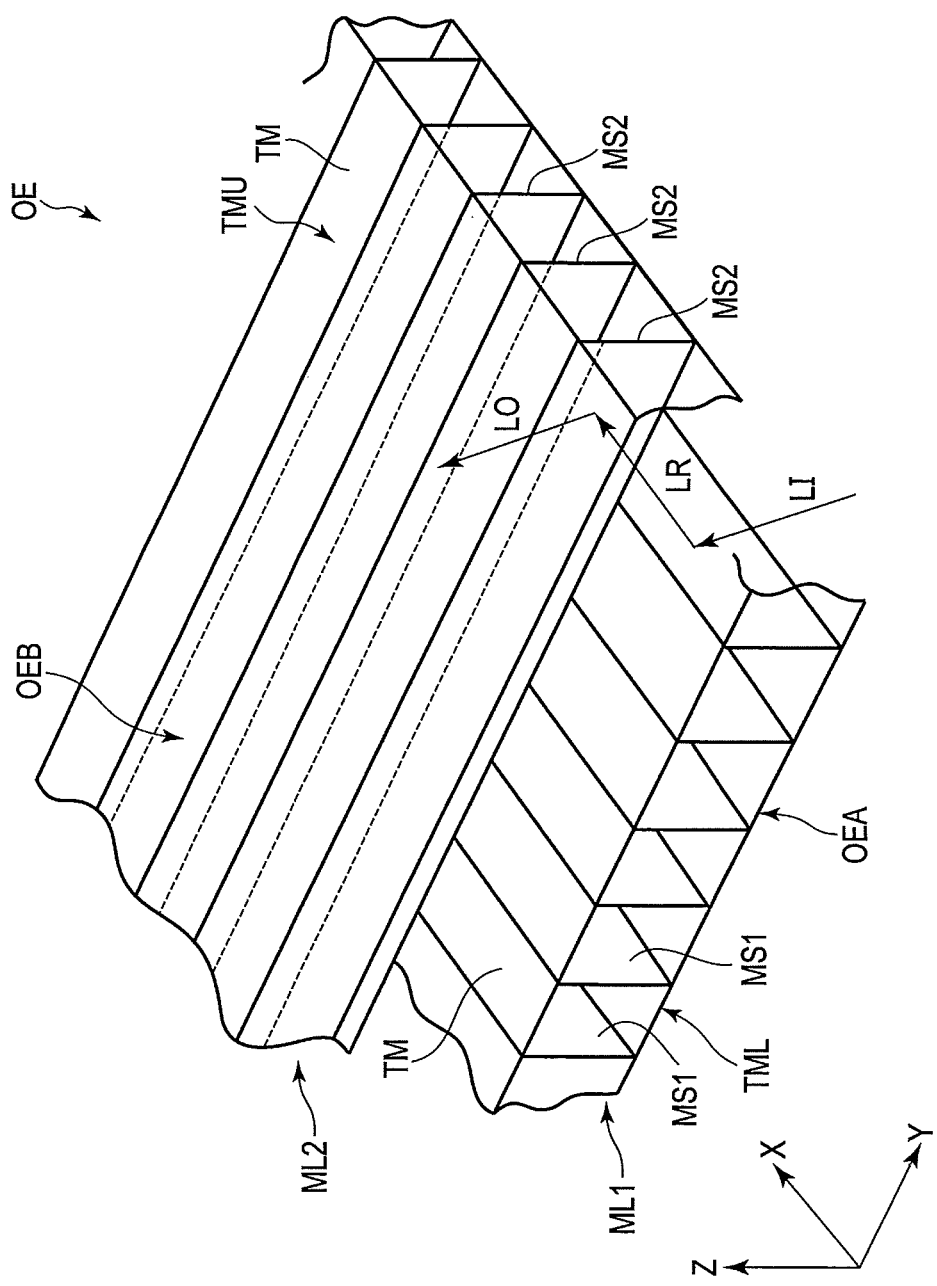
F I G. 5

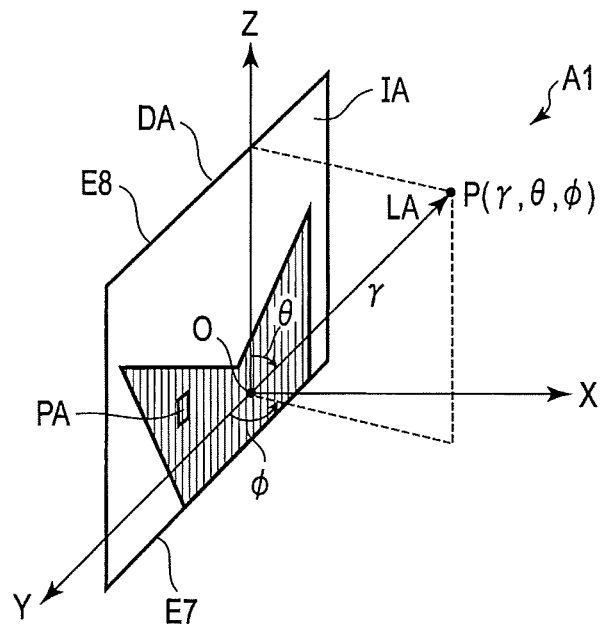
F I G. 7
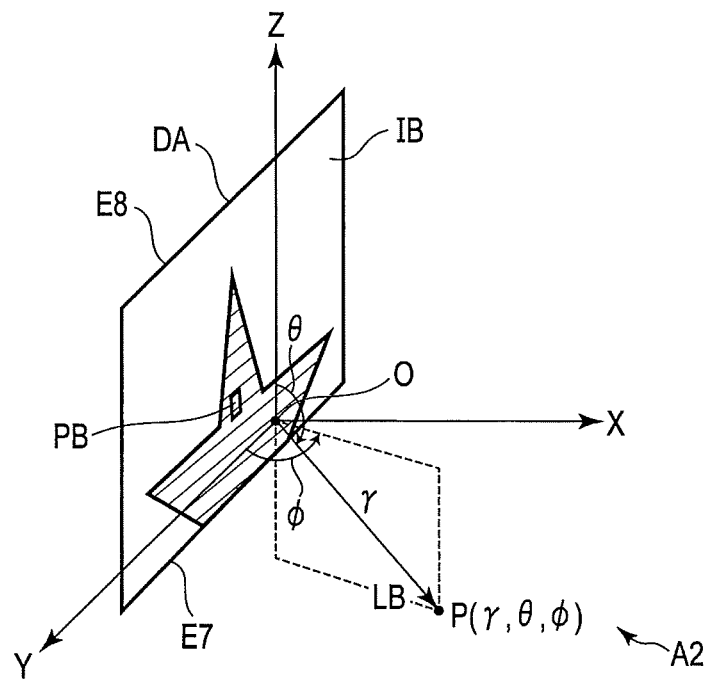
F I G. 8

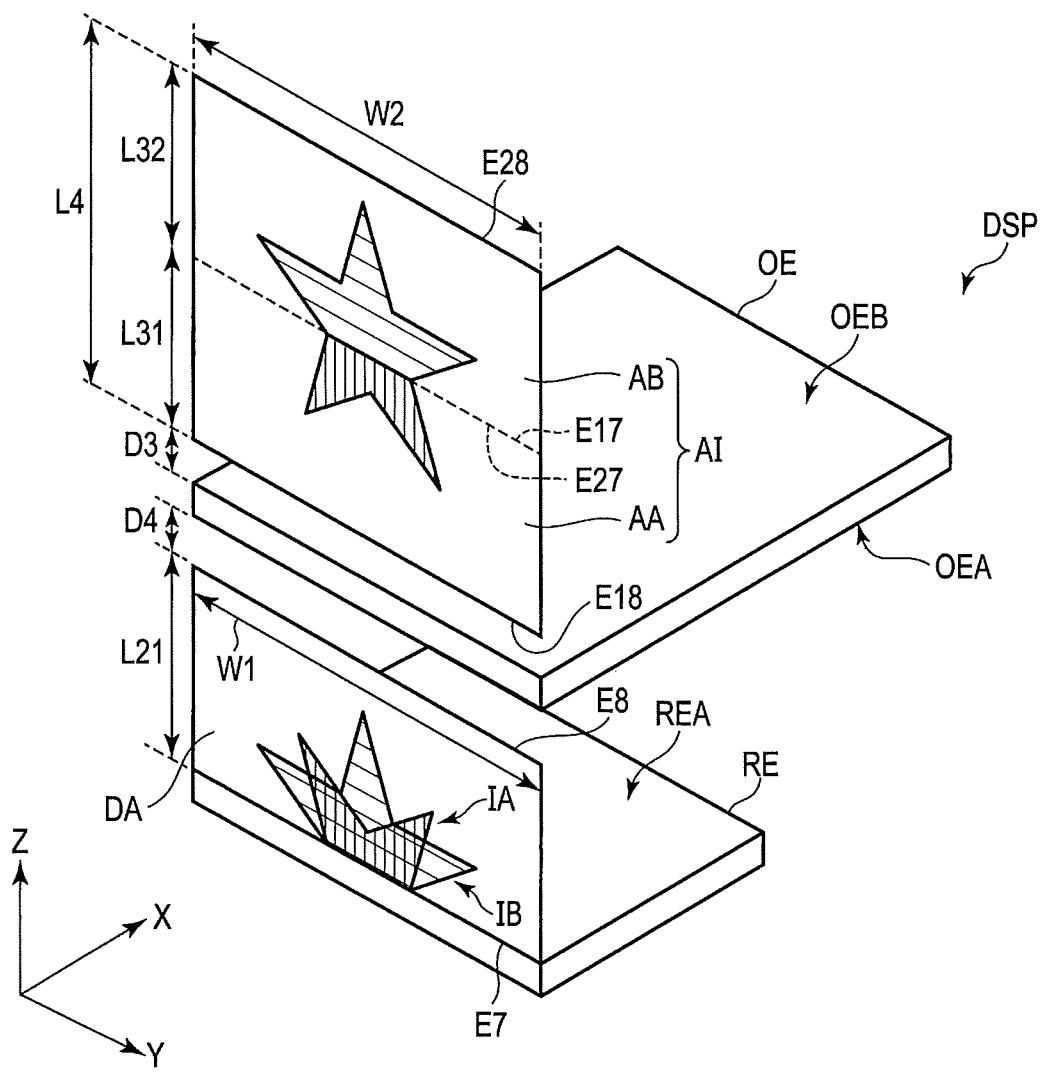
F I G. 9

DISPLAY DEVICE

CROSS-REFERENCE TO RELATED APPLICATIONS

This application is based upon and claims the benefit of priority from Japanese Patent Application No. 2018-053427, filed Mar. 20, 2018, the entire contents of which are incorporated herein by reference.

FIELD

Embodiments described herein relate generally to a display device.

BACKGROUND

Recently, technologies for displaying an aerial image have been considered variously. In one example, a spatial image display device, which comprises a light reflection optical device in which microscopic mirror units having first and second light-reflecting surfaces are arrayed in a matrix, and forms a mirror image by reflecting display light twice by the first and second light-reflecting surfaces, is disclosed. As another example, an optical system comprising a reflective imaging element which reflects light from an object for an even number of times and forms an image of the object to be projected is disclosed.

BRIEF DESCRIPTION OF THE DRAWINGS

FIG. 4 is an illustration showing a configuration example of a display panel PNL shown in FIG. 3.

FIG. 5 is a perspective view showing a configuration example of an optical member OE shown in FIG. 1.

FIG. 7 is an illustration showing a first image IA of images displayed in a display area DA.

FIG. 8 is an illustration showing a second image IB of the images displayed in the display area DA.

FIG. 9 is an illustration for explaining a display example of an aerial image AI in the display device DSP.

DETAILED DESCRIPTION

Figure 1:
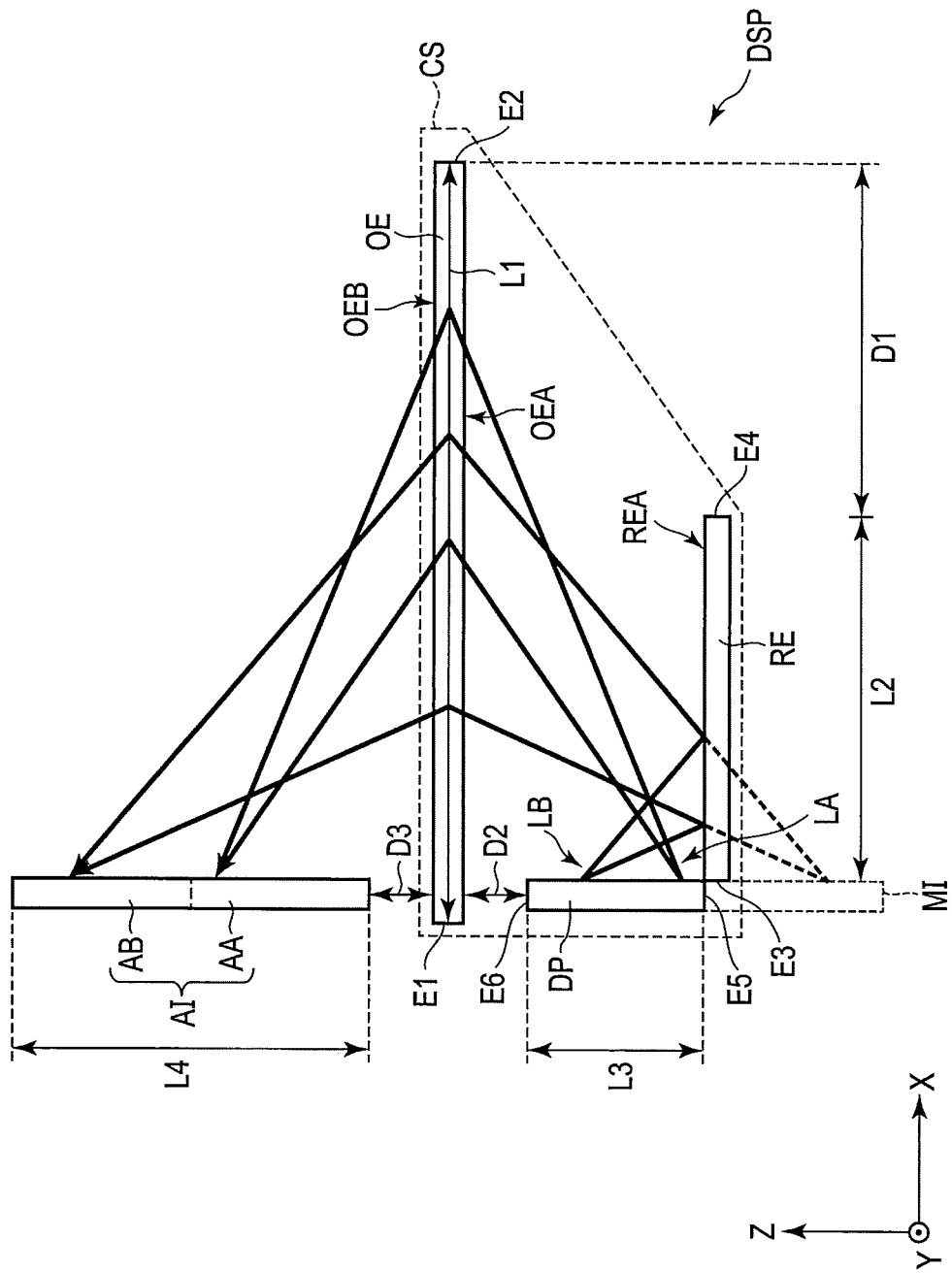
FIG. 1 is a cross-sectional view showing a display device DSP of the present embodiment.

In general, according to one embodiment, a display device comprises: an optical member including a first main surface, and a second main surface on a side opposite to the first main surface, the optical member configured to form an image on a side of the second main surface with light incident from the first main surface; a reflective member including a reflective surface opposed to the first main surface; and a display portion located between the optical member and the reflective member, wherein the reflective member is arranged parallel to the optical member.

According to another embodiment, a display device comprises: an optical member including a first main surface, and a second main surface on a side opposite to the first main surface, the optical member configured to form an image on a side of the second main surface with light incident from the first main surface; a reflective member including a reflective surface opposed to the first main surface; and a display portion located between the optical member and the reflective member, wherein the display portion is arranged perpendicularly to the reflective member.

According to yet another embodiment, a display device comprises: an optical member including a first main surface, and a second main surface on a side opposite to the first main surface, the optical member configured to form an image on a side of the second main surface with light incident from the first main surface; a reflective member including a reflective surface opposed to the first main surface; and a display portion located between the optical member and the reflective member, wherein an angle formed between the reflective member and the optical member is an acute angle.

According to yet another embodiment, a display device comprises: an optical member including a first main surface, and a second main surface on a side opposite to the first main surface, the optical member configured to form an image on a side of the second main surface with light incident from the first main surface; a reflective member including a reflective surface opposed to the first main surface; and a display portion located between the optical member and the reflective member, wherein the display portion comprises: a display panel comprising a first pixel which forms a first image, and a second pixel which forms a second image; and a light beam control member configured to emit first display light from the first pixel toward the optical member, and configured to emit second display light from the second pixel toward the reflective member.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented, but such schematic illustration is merely exemplary, and in no way restricts the interpretation of the invention. Further, in the specification and drawings, structural elements which function in the same or a similar manner to those described in connection with preceding drawings are denoted by like reference numbers, and redundant detailed description thereof is omitted unless necessary.

FIG. 1 is a cross-sectional view showing a display device DSP of the present embodiment. While a first direction X, a second direction Y, and a third direction Z in the drawing are orthogonal to each other, they may cross each other at an angle other than 90 degrees.

The display device DSP includes a display portion DP, an optical member OE, a reflective member RE, and a housing CS. The display portion DP, the optical member OE, and the reflective member RE are accommodated in the housing CS. In the drawings, the housing CS is shown by a dotted line.

The optical member OE extends in the first direction X and the second direction Y. The optical member OE includes a first main surface CEA and a second main surface OEB located on a side opposite to the first main surface CEA. Each of the first main surface OEA and the second main surface OEB is a surface parallel to, for example, an X-Y plane defined by the first direction X and the second direction Y. The first main surface OEA is located on a side facing the display portion DP and the reflective member RE. The optical member OE includes an end portion E1 close to the display portion DP, and an end portion E2 located on a side opposite to the end portion E1. The optical member OE has a length L1 along the first direction X between the end portion E1 and the end portion E2. Although details of the optical member OE will be described later, by the optical member OE, an image is formed on the second main surface OEB side after incident light from the first main surface OEA has been reflected multiple times.

The reflective member RE extends in the first direction X and the second direction Y. The reflective member RE includes a reflective surface REA facing the first main surface OEA. In the example illustrated, the reflective member RE is arranged at a position parallel to the optical member OE. In other words, the reflective surface REA is a plane parallel to the X-Y plane. The reflective member RE includes an end portion E3 close to the display portion DP, and an end portion E4 located on a side opposite to the end portion E3. The reflective member RE has a length L2 along the first direction X between the end portion E3 and the end portion E4. The length L2 is less than the length L1. For example, the length L2 is less than half the length L1. Further, the end portion E4 is located between the end portion E3 and the end portion E2 in the first direction X. A distance D1 along the first direction X between the end portion E4 and the end portion E2 is greater than or equal to the length L2. The reflective member RE is formed of, for example, a material having light reflectivity such as silver (Ag), aluminum (Al), or an aluminum alloy. Also, the reflective member RE may be a dielectric multilayer film in which dielectrics whose refractive indexes differ greatly are stacked. Further, the reflective member RE may be a reflective polarizer. Examples of the reflective polarizer are a brightness enhancement film which transmits p-polarized light and reflects s-polarized light, a wire-grid polarizer, which is a metal grid formed at a pitch narrower than a visible light wavelength, and transmits p-polarized light and reflects s-polarized light, and the like.

The display portion DP extends in the second direction Y and the third direction Z. The display portion DP is located between the optical member OE and the reflective member RE. In the example illustrated, the display portion DP is arranged at a position orthogonal to the reflective member RE. Also, the display portion DP is arranged at a position orthogonal to the optical member OE. In other words, the display portion DP is arranged along a Y-Z plane defined by the second direction Y and the third direction Z. The display portion DP includes an end portion E5 close to the reflective member RE, and an end portion E6 close to the optical member OE. The display portion DP has a length L3 along the third direction Z between the end portion E5 and the end portion E6. The length L3 is less than either of the length L1 and the length L2. A distance D2 along the third direction Z between the end portion E6 and the end portion E1 is a parameter which determines a floating height D3 of an aerial image AI, as will be described later, and can be set as required. Note that the distance D2 may be zero (which means that the display portion DP may be in contact with the optical member OE). Although the display portion DP comprises a display panel which emits display light, the structure of the display panel is not particularly limited. For example, the display panel may be any of a panel holding a liquid crystal layer between a pair of substrates, a self-luminous panel including an organic electroluminescent element and the like, an electronic paper panel including a cataphoretic element and the like, a panel employing microelectromechanical systems (MEMS), and a panel employing electrochromism.

Note that the display device DSP is not limited to the example illustrated. That is, for example, the reflective member RE need not be parallel to the optical member OE, and the display portion DP need not be orthogonal to the reflective member RE. Also, the display portion DP may be in contact with the reflective member RE, or away from the reflective member RE.

Next, display light emitted from the display portion DP will be described.

The display portion DP has the function of displaying a first image and a second image, and also emitting first display light LA which constitutes the first image toward the optical member OE, while emitting second display light LB which constitutes the second image toward the reflective member RE. Beams of the first display light LA and the second display light LB are light beams emitted from different pixels, respectively.

The first display light LA enters the optical member OE from the first main surface OEA. By the optical member OE, after the first display light LA has been reflected multiple times, the first display light LA is emitted from the second main surface OEB, and an image is formed on a side opposite to the display portion DP as a first aerial image AA. The first aerial image AA as described above corresponds to an inverted image of the first image. In other words, the first aerial image AA is displayed at a position symmetric to the display portion DP with respect to the optical member OE.

After the second display light LB has been reflected by the reflective surface REA, the second display light LB enters the optical member OE from the first main surface OEA. After the second display light LB has been reflected multiple times by the optical member OE, the optical member OE emits the second display light LB from the second main surface OEB, and forms an image as a second aerial image AB. The second aerial image AB as described above corresponds to an erect image of the second image. In other words, the second aerial image AB is displayed at a position symmetric to a mirror image MI formed by the reflective member RE with respect to the optical member OE.

The first aerial image AA and the second aerial image AB are displayed next to each other in the third direction Z without overlapping each other. The second aerial image AB is located above the first aerial image AA, that is, on a side away from the optical member OE. The aerial image AI, which is formed by the first aerial image AA and the second aerial image AB, has a length L4 along the third direction Z. The length L4 is approximately double the length L3 of the display portion DP. In other words, the display device DSP can display the aerial image AI having the length L4, which is greater than the length L3 of the display portion DP.

In the example shown in FIG. 1, the length L1 corresponds to a first length, the length L2 corresponds to a second length, and the length L3 corresponds to a third length.

Figure 2:
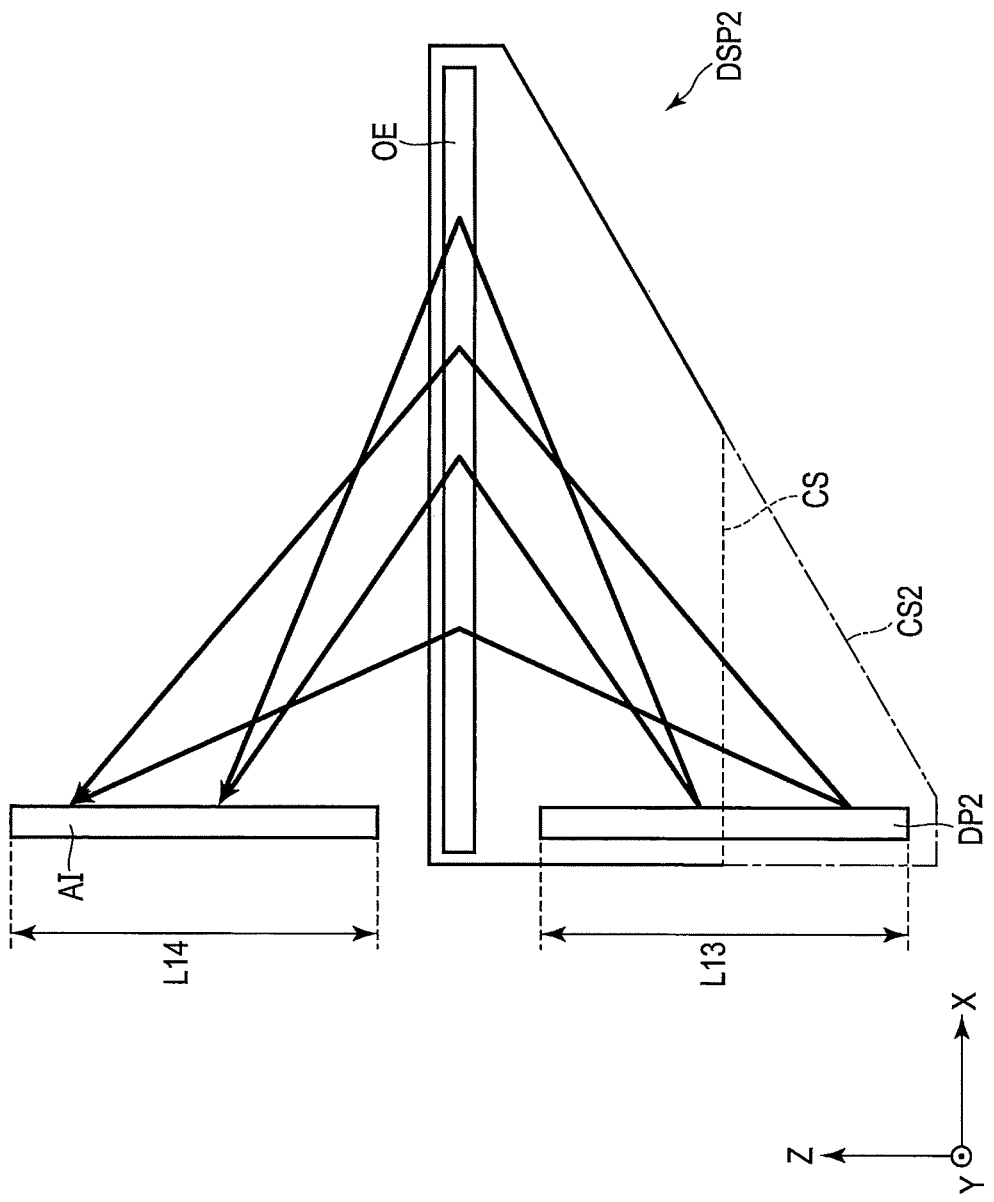
FIG. 2 is a cross-sectional view showing a display device DSP2 of a comparative example.

FIG. 2 is a cross-sectional view showing a display device DSP2 of a comparative example.

The display device DSP2 displays the aerial image AI whose size is equal to the size of a display portion DP2. In other words, a length L14 of the aerial image AI is equal to a length L13 of the display portion DP2. In the display device DSP2, when the aerial image AI whose size is equal to the size of the aerial image AI shown in FIG. 1 is to be displayed, the size of the display portion DP2 is approximately double the size of the display portion DP shown in FIG. 1. In particular, the length L13 of the display portion DP2 is approximately double the length L3 of the display portion DP. Accordingly, the thickness of a housing CS2, which accommodates the display portion DP2, along the third direction Z is approximately double the thickness of the housing CS shown in FIG. 1. In the drawing, the housing CS is shown by a dotted line, the housing CS2 is shown by a one-dot chain line, and an area where the housing CS and the housing CS2 overlap each other is shown by a solid line. The housing CS is smaller than the housing CS2 by an area surrounded by the one-dot chain line and the dotted line.

According to the display device DSP of the present embodiment, the display device DSP comprises the display portion DP located between the optical member OE and the reflective member RE, and while the first display light LA which constitutes the first image is emitted toward the optical member OE, the second display light LB which constitutes the second image is emitted toward the reflective member RE. In this way, the display device DSP can display the aerial image AI having the length L4 greater than the length L3 of the display portion DP. Further, as compared to the display device DSP2 of the comparative example, the volume of the housing CS can be reduced, and the display device DSP can be downsized.

Figure 3:
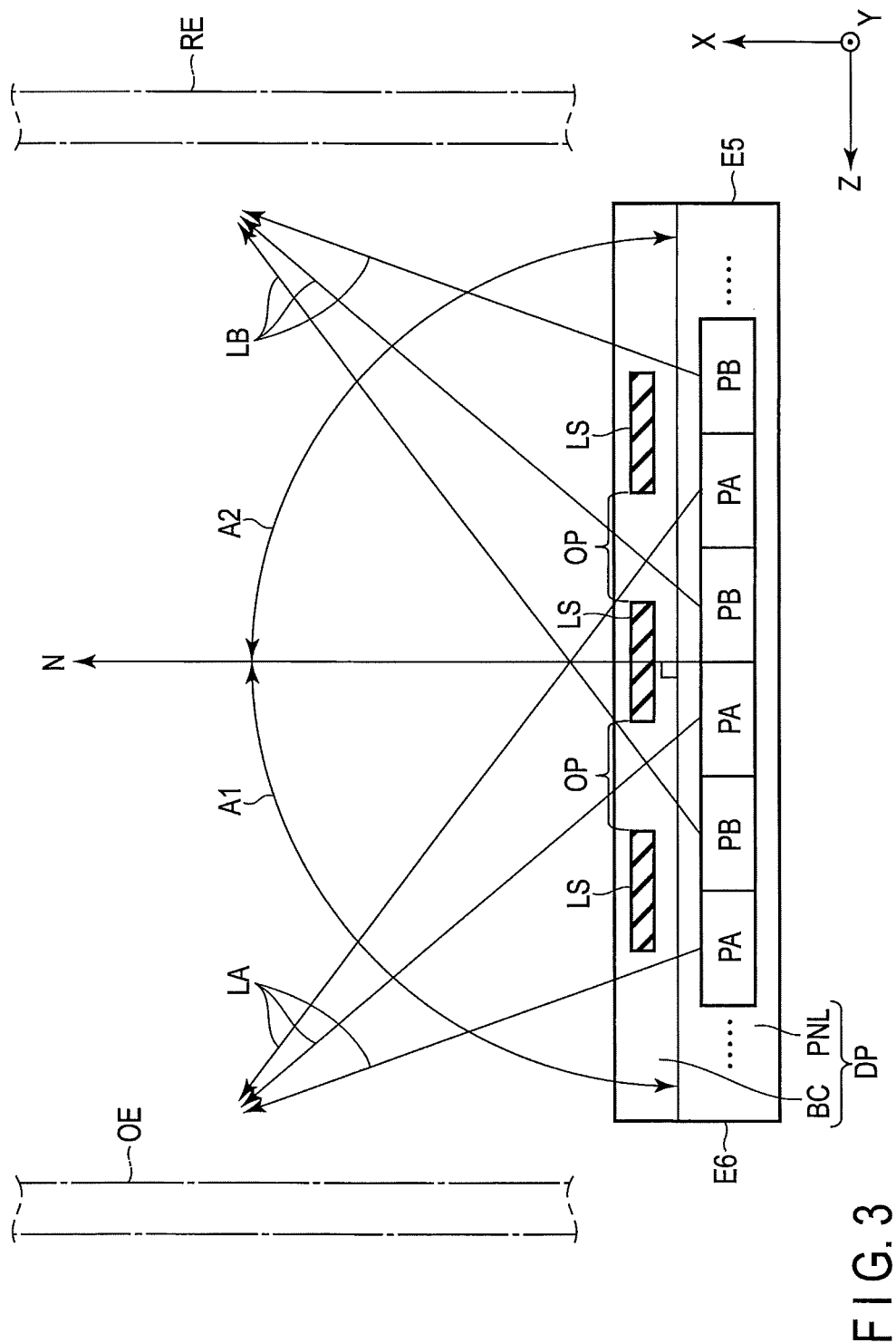
FIG. 3 is a cross-sectional view showing a configuration example of a display portion DP shown in FIG. 1.

FIG. 3 is a cross-sectional view showing a configuration example of the display portion DP shown in FIG. 1.

The display portion DP comprises a display panel PNL, and a light beam control member BC. In the example illustrated, the light beam control member BC is located on the side of a front surface of the display panel PNL, and the display panel PNL and the light beam control member BC are arranged in the first direction X in this order. The display panel PNL comprises a first pixel PA and a second pixel PB arranged in the third direction Z, between the end portion E5 and the end portion E6. The first pixels PA correspond to pixels for forming the first image, and the second pixels PB correspond to pixels for forming the second image. In the example illustrated, the first pixel PA and the second pixel PB are arranged alternately. Note that each of the first pixel PA and the second pixel PB may be a single main pixel including, for example, a red pixel, a green pixel, and a blue pixel, or may include a plurality of main pixels. Here, the main pixel is the minimum unit which constitutes a color image.

The light beam control member BC is constituted by a parallax barrier obtained by combining, for example, a light-shielding body LS and an opening OP. The light-shielding body LS and the opening OP are arranged alternately along the third direction Z, and extend in the second direction Y, respectively. Each of the light-shielding body LS and the opening OP is disposed across the first pixel PA and the second pixel PB, for example. When the first pixel PA and the second pixel PB facing a certain opening OP is focused, the first pixel PA is located on a side close to the end portion E5, and the second pixel PB is located on a side close to the end portion E6.

Note that the light beam control member BC is not limited to the example illustrated. That is, the light beam control member BC may be constituted by a lens array in which a plurality of lenses are arranged, or may be constituted by a lighting unit which imparts directivity to illumination light which illuminates the display panel PNL. Further, the light beam control member BC may be located on a back surface side of the display panel PNL, or may be incorporated in the display panel PNL.

In the display portion DP as described above, the display panel PNL emits the first display light LA from the first pixel PA in order to display the first image, and also emits the second display light LB from the second pixel PB in order to display the second image. The light beam control member BC emits the first display light LA from the first pixel PA toward the optical member OE, and also emits the second display light LB from the second pixel PB toward the reflective member RE. More specifically, in an X-Z plane defined by the first direction X and the third direction Z, the first display light LA is emitted within an area A1 between a normal N of the display panel PNL and the end portion E6. Also, the second display light LB is emitted within an area A2 between the normal N and the end portion E5. It is assumed that the display portion DP mentioned above is arranged such that the normal N of the display panel PNL agrees with the first direction X. Detailed explanation of the areas A1 and A2 will be given later.

In the example shown in FIG. 3, the end portion E5 corresponds to a first end portion, and the end portion E6 corresponds to a second end portion.

FIG. 4 is an illustration showing a configuration example of the display panel PNL shown in FIG. 3. An active-matrix-driving transmissive liquid crystal display panel will be described as an example of the display panel PNL. The display panel PNL is formed in a plate shape parallel to the Y-Z plane. The display panel PNL comprises a first substrate SUB1, a second substrate SUB2 opposed to the first substrate SUB1, and a liquid crystal layer LC held between the first substrate SUB1 and the second substrate SUB2. The first substrate SUB1 and the second substrate SUB2 are bonded to each other with a predetermined cell gap formed between the substrates. The display panel PNL includes a display area DA where an image is displayed. The display area DA includes sub-pixels PX arrayed in a matrix in the second direction Y and the third direction Z. The display area DA includes an end portion E7 close to the end portion E5, and an end portion E8 close to the end portion E6.

The display area DA includes, for example, a red pixel PXR which displays red, a green pixel PXG which displays green, and a blue pixel PXB which displays blue, as the sub-pixels PX. Note that the display area DA may further include a sub-pixel of a color different from red, green and blue (for example, a white pixel which displays white). In the example illustrated, each of the first pixel PA and the second pixel PB includes the red pixel PXR, the green pixel PXG, and the blue pixel PXB.

The first substrate SUB1 comprises scanning lines G and signal lines S crossing the scanning lines G. Each of the scanning lines G is drawn outside the display area DA, and is connected to a scanning line driver GD. Each of the signal lines S is drawn outside the display area DA, and is connected to a signal line driver SD. The scanning line driver GD and the signal line driver SD are connected to a controller CNT. The controller CNT generates a control signal based on a video signal, and controls the scanning line driver GD and the signal line driver SD.

Each of the sub-pixels PX includes a switching element SW, a pixel electrode PE, a common electrode CE, and the like. The switching element SW is electrically connected to the scanning line G and the signal line S. The switching element SW is composed of, for example, a thin-film transistor. The pixel electrode PE is electrically connected to the switching element SW. The common electrode CE is opposed to each of the pixel electrodes PE.

FIG. 5 is a perspective view showing a configuration example of the optical member OE shown in FIG. 1.

The optical member OE includes a first mirror layer ML1, and a second mirror layer ML2. The first mirror layer ML1 and the second mirror layer ML2 are stacked in the third direction Z. The first mirror layer ML1 includes a plurality of first reflective surfaces MS1. The first reflective surface MS1 is a surface parallel to, for example, the X-Z plane defined. The first reflective surfaces MS1 are arranged at regular intervals in the second direction Y. The second mirror layer ML2 similarly includes a plurality of second reflective surfaces MS2. The second reflective surface MS2 is a surface parallel to, for example, the Y-Z plane. The second reflective surfaces MS2 are arranged at regular intervals in the first direction X. The first reflective surface MS1 and the second reflective surface MS2 are orthogonal to each other.

In one example, the first mirror layer ML1 is constituted by forming the first reflective surface MS1 on a side surface of each of transparent members TM extending in the first direction X, and stacking the transparent members TM in the second direction Y. A lower surface TML of these transparent members TM forms the first main surface OEA of the optical member OE. Similarly, the second mirror layer ML2 is constituted by stacking the transparent members TM, which extend in the second direction Y, in the first direction X, and an upper surface TMU of these transparent members TM forms the second main surface OEB of the optical member OE. The transparent member TM is formed of, for example, glass or resin.

In the optical member OE as described above, incident light LI from the first main surface CEA is reflected by the first reflective surface MS1, and reflective light LR from the first reflective surface MS1 is reflected by the second reflective surface MS2, and is emitted from the second main surface OEB as emitted light LO. In this way, the optical member OE reflects the incident light LI twice, and displays the aerial image AI at a position symmetric to the display portion DP with respect to the optical member OE. Note that in order to suppress reflection of the incident light LI by the first main surface IDEA, an antireflection film may be formed on the first main surface OEA. Examples of the antireflection film are a dielectric multilayer film, a moth-eye structure film, and the like.

Next, a display example of the aerial image AI in the display device DSP will be explained with reference to FIGS. 6 to 9.

Figure 6:
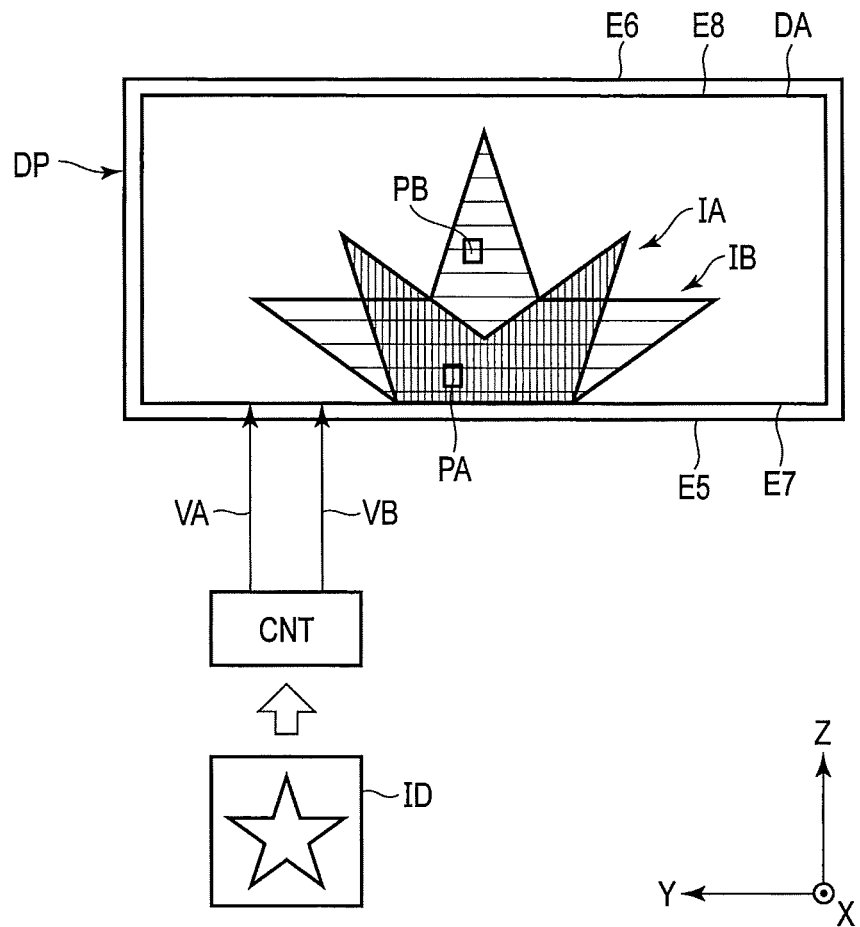
FIG. 6 is an illustration showing a configuration example of the display portion DP.

FIG. 6 is an illustration showing a display example of the display portion DP.

The controller CNT generates, on the basis of image data ID corresponding to an image to be displayed as an aerial image, a first video signal VA necessary for displaying a first image IA, and a second video signal VB necessary for displaying a second image IB, and also generates the other control signals, and supplies these signals to the display portion DP. In one example, the image data ID corresponding to a star-shaped aerial image is supplied to the controller CNT from outside.

The display portion DP controls the first pixel PA and displays the first image IA based on the first video signal VA, and also controls the second pixel PB and displays the second image IB based on the second video signal VB. The first image IA includes a lower half pattern of the star shape, as shown by vertical stripes. The second image IB includes an upper half pattern of the star shape, as shown by horizontal stripes. The first image IA is vertically inverted relative to the second image IB. For example, when it is assumed that the second image IB is an erect image, the first image IA is an inverted image. A boundary between the first image IA and the second image IB is displayed at a position closest to the end portion E7 of the display area DA. In other words, the display portion DP folds an image to be displayed as the aerial image AI in half, and displays one the folded images as the first image IA, and the other image as the second image IB.

FIG. 7 is an illustration showing the first image IA of the images displayed in the display area DA. The first image IA is formed by an aggregate of the first pixels PA. The first display light LA which constitutes the first image IA is emitted within the area A1 by the function of the above-described light beam control member BC.

FIG. 8 is an illustration showing the second image IB of the images displayed in the display area DA. The second image IB is formed by an aggregate of the second pixels PB. The second display light LB which constitutes the second image IB is emitted within the area A2 by the function of the above-described light beam control member BC.

Here, the area A1 showing space in which the first display light LA is emitted, and the area A2 showing space in which the second display light LB is emitted will be described in detail with reference to FIGS. 7 and 8.

In FIG. 7, it is assumed that an emission point of the first display light LA in the display portion DA is the origin O, and the position of a point P within the area A1 is represented by polar coordinates ($\gamma$, $\theta$, $\phi$). The relationships between the XYZ rectangular coordinates and the polar coordinates are as follows:

$X = \gamma \sin(\theta)\sin(\phi)$;
$Y = \gamma \sin(\theta)\cos(\phi)$; and
$Z = \gamma \cos(\theta)$.

In the above relationships, the area A1 corresponds to an area satisfying the relationships of $0 \le \theta \le 90$ and $0 \le \phi \le 180$.

Similarly, in FIG. 8, when it is assumed that an emission point of the second display light LB in the display portion DA is the origin O, and the position of the point P within the area A2 is represented by polar coordinates ($\gamma$, $\theta$, $\phi$), the area A2 corresponds to an area satisfying the relationships of $90 \le \theta \le 180$ and $0 \le \phi \le 180$.

FIG. 9 is an illustration for explaining a display example of the aerial image AI in the display device DSP.

As has been explained with reference to FIG. 7, since the first display light LA which constitutes the first image IA is emitted within the area A1, the first display light LA enters the optical member OE, and forms the first aerial image AA. The first aerial image AA includes an end portion E18 on a side close to the optical member OE, and an end portion E17 on a side away from the optical member OE. Since the first aerial image AA is an inverted image of the first image IA, an image near the end portion E8 is displayed near the end portion E18, and an image near the end portion E7 is displayed near the end portion E17. The first aerial image AA has a length L31 along the third direction Z between the end portion E18 and the end portion E17. The display area DA has a length L21 along the third direction Z between the end portion E7 and the end portion E8. The length L31 is equal to the length L21.

As has been explained with reference to FIG. 8, since the second display light LB which constitutes the second image IB is emitted within the area A2, the second display light LB enters the optical member OE after being reflected by the reflective member RE, and forms the second aerial image AB. The second aerial image AB includes an end portion E27 on a side close to the optical member OE, and an end portion E28 on a side away from the optical member OE. Since the second aerial image AB is an erect image of the second image IB, an image near the end portion E8 is displayed near the end portion E28, and an image near the end portion E7 is displayed near the end portion E27. A length L32 along the third direction Z from the end portion E27 to the end portion E28 is equal to the length L21. Note that a width W1 of the display area DA along the second direction Y is equal to a width W2 of each of the first aerial image AA and the second aerial image AB.

When there is no gap between the first aerial image AA and the second aerial image AB, and the end portion E17 and the end portion E27 are arranged contiguously in a row in the third direction Z, the length L4 of the aerial image AI corresponds to the sum of the length L31 and the length L32. In other words, the length L4 is double the length L21 of the display area DA. The aerial image AI as described above is formed as the end portion E7 of the display area DA contacts the reflective surface REA of the reflective member RE. Consequently, a continuous aerial image AI can be displayed.

When a gap is formed between the end portion E7 and the reflective surface REA, the second aerial image AB is away from the first aerial image AA toward the upper side (i.e., in a direction of an arrow representing the third direction Z).

When the end portion E8 is away from the first main surface OEA of the optical member OE, the aerial image AI floats in the upper side relative to the second main surface OEB. The floating height D3 of the aerial image AI corresponds to a distance from the second main surface OEB to the end portion E18 of the first aerial image AA. The floating height D3 is equal to a distance D4 from the end portion E8 of the display area DA to the first main surface OEA.

In the example shown in FIG. 9, the end portion E7 corresponds to a third end portion, and the end portion E8 corresponds to a fourth end portion.

Figure 10:
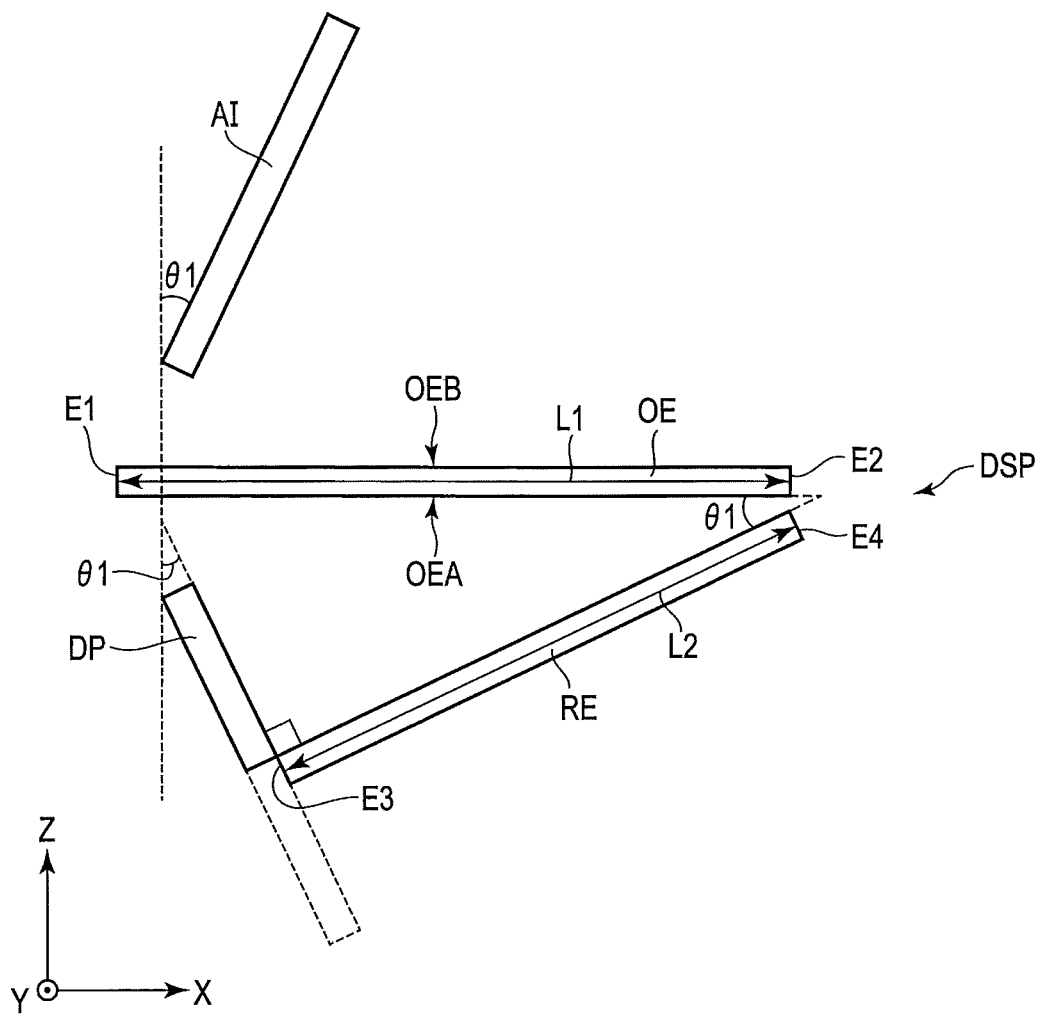
FIG. 10 is a cross-sectional view showing another configuration example of the display device DSP.

FIG. 10 is a cross-sectional view showing another configuration example of the display device DSP.

The configuration example shown in FIG. 10 is different from the configuration example shown in FIG. 1 in that the optical member OE and the reflective member RE are not parallel to each other. Also, the illustrated configuration example is different in the point that the optical member OE and the display portion DP are not orthogonal to each other. Note that the display portion DP and the reflective member RE are orthogonal to each other. When the optical member OE is shaped like a flat plate parallel to the X-Y plane, the reflective member RE and the display portion DP both intersect the X-Y plane, but are not orthogonal to the X-Y plane. Angle $\theta1$ formed between the reflective member RE and the optical member OE is an acute angle. The end portion E4 is closer to the first main surface OEA than the third end portion E3 in the third direction Z. The length L2 is less than the length L1. The display portion DP is inclined relative to the Y-Z plane, and the angle of inclination is equal to angle $\theta1$ formed between the reflective member RE and the optical member OE. Similarly, the aerial image AI is inclined relative to the Y-Z plane by angle $\theta1$.

According to such a configuration example, the same advantage as that of the above configuration examples can be obtained. In addition, the display device DSP can display the aerial image AI which is inclined toward the end portion E2 side relative to a normal direction of the optical member OE.

As explained above, according to the present embodiment, it is possible to provide a display device which can form an image in space and whose size can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   an optical member including a first main surface, and a second main surface on a side opposite to the first main surface, the optical member configured to form an image on a side of the second main surface with light incident from the first main surface;
   a reflective member including a reflective surface opposed to the first main surface; and
   a display portion located between the optical member and the reflective member, wherein
   the reflective member is arranged parallel to the optical member;
   the display portion includes a display area where an image is displayed;
   the display area includes a third end portion opposed to the reflective member, and a fourth end portion opposed to the optical member; and
   the third end portion is in contact with the reflective surface.

2. The display device of claim 1, wherein the display area is arranged perpendicularly to the reflective surface.

3. The display device of claim 1, wherein the display portion comprises:
   a display panel comprising a first end portion opposed to the reflective member, a second end portion opposed to the optical member, and a first pixel and a second pixel located between the first end portion and the second end portion; and
   a light beam control member configured to emit first display light from the first pixel between a normal of the display panel and the second end portion, and configured to emit second display light from the second pixel between the normal and the first end portion.

4. The display device of claim 3, wherein the first pixel and the second pixel are arranged in a direction from the first end portion toward the second end portion.

5. The display device of claim 1, wherein:
   the optical member has a first length;
   the reflective member has a second length; and
   the second length is less than the first length.

6. The display device of claim 5, wherein:
   the display portion has a third length; and
   the third length is less than the first length.

7. The display device of claim 1, wherein the fourth end portion is away from the first main surface.

8. A display device comprising:
   an optical member including a first main surface, and a second main surface on a side opposite to the first main surface, the optical member configured to form an image on a side of the second main surface with light incident from the first main surface;
   a reflective member including a reflective surface opposed to the first main surface; and
   a display portion located between the optical member and the reflective member, wherein
   the display portion eludes a display area where an image is displayed;
   the display area includes a third end portion opposed to the reflective member, and a fourth end portion opposed to the optical member;

the third end portion is in contact with the reflective member; and the display area is arranged perpendicularly to the reflective surface.

9. The display device of claim 8, wherein the reflective member is arranged parallel to the optical member.

10. The display device of claim 8, wherein an angle formed between the reflective member and the optical member is an acute angle.

11. The display device of claim 8, wherein the display portion comprises:
a display panel comprising a first end portion opposed to the reflective member, a second end portion opposed to the optical member, and a first pixel and a second pixel located between the first end portion and the second end portion; and
a light beam control member configured to emit first display light from the first pixel between a normal of the display panel and the second end portion, and configured to emit second display light from the second pixel between the normal and the first end portion.

12. The display device of claim 11, wherein the first pixel and the second pixel are arranged in a direction from the first end portion toward the second end portion.

13. The display device of claim 8, wherein:
the optical member has a first length;
the reflective member has a second length; and
the second length is less than the first length.

14. The display device of claim 13, wherein:
the display portion has a third length; and
the third length is less than the first length.

15. The display device of claim 8, wherein the fourth end portion is away from the first main surface.

16. A display device comprising:
an optical member including a first main surface, and a second main surface on a side opposite to the first main surface, the optical member configured to form an image on a side of the second main surface with light incident from the first main surface;
a reflective member including a reflective surface opposed to the first main surface; and
a display portion located between the optical member and the reflective member, wherein
an angle formed between the reflective member and the optical member is an acute angle;
the display portion includes a display area where an image is displayed;
the display area includes a third end portion opposed to the reflective member, and a fourth end portion opposed to the optical member; and
the third end portion is in contact with the reflective surface.

17. A display device comprising:
an optical member including a first main surface, and a second main surface on a side opposite to the first main surface, the optical member configured to form an image on a side of the second main surface with light incident from the first main surface;
a reflective member including a reflective surface opposed to the first main surface; and
a display portion located between the optical member and the reflective member, wherein
the display portion comprises:
a display panel comprising a first pixel which forms a first image, and a second pixel which forms a second image;
a light beam control member configured to emit first display light from the first pixel toward the optical member, and configured to emit second display light from the second pixel toward the reflective member;
the display portion includes a display area where an image is displayed;
the display area includes a third end portion opposed to the reflective member, and a fourth end portion opposed to the optical member; and
the third end portion is in contact with the reflective surface.

* * * * *